(12) United States Patent
Chavan et al.

(10) Patent No.: US 10,966,023 B2
(45) Date of Patent: Mar. 30, 2021

(54) LIGHTING SYSTEM WITH REMOTE MICROPHONE

(71) Applicant: SIGNIFY HOLDING B.V., Eindhoven (NL)

(72) Inventors: Vaibhav Chavan, Ratnagiri (IN); Nam Chin Cho, Peachtree City, GA (US); Pengseng Tan, Peachtree City, GA (US); Parth Joshi, Atlanta, GA (US); Brad Edward Paine, Fayetteville, GA (US); Kenneth Dale Walma, Peachtree City, GA (US); William T. Cook, Peachtree City, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/554,423

(22) Filed: Aug. 28, 2019

(65) Prior Publication Data

US 2019/0387314 A1 Dec. 19, 2019

Related U.S. Application Data

(63) Continuation-in-part of application No. 16/538,435, filed on Aug. 12, 2019, which is a continuation of
(Continued)

(51) Int. Cl.
*H04R 3/00* (2006.01)
*F21V 33/00* (2006.01)
(Continued)

(52) U.S. Cl.
CPC ............... *H04R 3/005* (2013.01); *F21K 9/20* (2016.08); *F21V 33/0056* (2013.01);
(Continued)

(58) Field of Classification Search
CPC .......... H04R 3/00; H04R 3/005; H04R 1/222; F21K 9/20; F21V 33/00; F21V 33/0056;
(Continued)

(56) References Cited

U.S. PATENT DOCUMENTS 9,462,663 B2 10/2016 Aggarwal et al.
9,504,132 B2 11/2016 Aggarwal et al.
(Continued)

FOREIGN PATENT DOCUMENTS

EP 0653701 8/2000
EP 2430632 9/2015
(Continued)

OTHER PUBLICATIONS https://www.legitreviews.com/sengled-snap-led-light-bulb-integrated-ip-camera-speaker-microphone_156203 Published Jan. 4, 2015 (about mic and speaker integrated led bulb); Jan. 4, 2015.
(Continued)

*Primary Examiner* — Thang V Tran (57) ABSTRACT

A lighting system with expanded coverage voice operation includes a lighting fixture that includes a wireless transceiver. The lighting system further includes a remote microphone device configured to receive a voice and to transmit wirelessly an audio stream generated from the voice. The lighting fixture is configured to receive the audio stream from the remote microphone device via the wireless transceiver and to transmit the audio stream to a cloud server.

19 Claims, 8 Drawing Sheets

Related U.S. Application Data application No. 16/051,333, filed on Jul. 31, 2018, now Pat. No. 10,382,863.

(60) Provisional application No. 62/539,978, filed on Aug. 1, 2017, provisional application No. 62/723,850, filed on Aug. 28, 2018.

(51) Int. Cl.

| | |
|---|---|
| *H05B 47/10* | (2020.01) |
| *F21K 9/20* | (2016.01) |
| *G10L 15/22* | (2006.01) |
| *G10K 11/175* | (2006.01) |
| *G06F 3/16* | (2006.01) |
| *H04R 1/22* | (2006.01) |
| *H05B 47/12* | (2020.01) |
| *G10L 25/51* | (2013.01) |

(52) U.S. Cl.
CPC .............. *G06F 3/165* (2013.01); *G06F 3/167* (2013.01); *G10K 11/175* (2013.01); *G10L 15/22* (2013.01); *H04R 1/222* (2013.01); *H05B 47/12* (2020.01); *G10L 25/51* (2013.01)

(58) Field of Classification Search
CPC .... H05B 47/12; H05B 47/105; H05B 47/125; H05B 47/155; H05B 47/175; H05B 47/19; G10K 15/20; G10K 15/22; G10L 15/22; G10L 25/51; G06F 3/16; G06F 3/165; G06F 3/167

See application file for complete search history.

(56) References Cited

U.S. PATENT DOCUMENTS

| | | | |
|---|---|---|---|
| 10,278,261 | B2 | 4/2019 | Aggarwal et al. |
| 2011/0151782 | A1* | 6/2011 | Sun ..................... H04M 1/6041 |
| | | | 455/41.2 |
| 2012/0070153 | A1* | 3/2012 | Jonsson .............. H04L 12/2827 |
| | | | 398/115 |
| 2014/0254829 | A1 | 9/2014 | Wang et al. |
| 2014/0354160 | A1* | 12/2014 | Aggarwal ............ H05B 47/155 |
| | | | 315/152 |
| 2015/0026580 | A1 | 1/2015 | Wang et al. |
| 2015/0032812 | A1 | 1/2015 | Dudley |
| 2015/0163881 | A1 | 6/2015 | Pederson |
| 2016/0014490 | A1 | 1/2016 | Bar Bracha et al. |
| 2017/0332168 | A1 | 11/2017 | Moghimi et al. |
| 2018/0177029 | A1 | 6/2018 | Wang |
| 2018/0308348 | A1* | 10/2018 | Deng ..................... G05B 15/02 |
| 2018/0317303 | A1 | 11/2018 | Carins et al. |
| 2018/0350363 | A1 | 12/2018 | Cook et al. |

FOREIGN PATENT DOCUMENTS

| | | |
|---|---|---|
| JP | 2006139107 | 6/2006 |
| KR | 20170054963 | 5/2017 |

OTHER PUBLICATIONS

C by G. https://www.gelighting.com/led-bulbs/product-family-c-by-ge pp. 1-9. Mar. 5, 2019.

* cited by examiner

LIGHTING SYSTEM WITH REMOTE MICROPHONE

CROSS REFERENCE TO RELATED APPLICATIONS

The present application claims priority under 35 U.S.C. Section 119(e) to U.S. Provisional Patent Application No. 62/723,850, filed Aug. 28, 2018 and titled "Lighting System With Remote Microphone." The present application also claims priority to and is a continuation-in-part of U.S. Nonprovisional patent application Ser. No. 16/538,435, filed Aug. 12, 2019, and titled "Lighting Integrated Sound Processing," which claims priority to and is a continuation of U.S. Nonprovisional patent application Ser. No. 16/051,333, filed Jul. 31, 2018, and titled "Lighting Integrated Sound Processing," which claims priority to U.S. Provisional Patent Application No. 62/539,978, filed Aug. 1, 2017, and titled "Lighting Integrated Sound Processing." The entire contents of all of the preceding applications are incorporated herein by reference.

TECHNICAL FIELD

The present disclosure relates generally to lighting related solutions, and more particularly to lighting systems with voice operation capabilities.

BACKGROUND

Some lighting fixtures and other devices may include built-in microphones that can receive sounds including voices (e.g., commands, questions, etc.). For example, a lighting fixture may turn on or off its light based on a voice command received by a built-in microphone. In some cases, voice commands received by a built-in microphone of a lighting fixture may be used to control other devices, such as other lighting fixtures. In general, a person giving a voice command has to be within a certain range of a lighting fixture with a built-in microphone for a voice command to be successfully received by the built-in microphone. In some applications, a solution that expands the coverage area of lighting fixtures with built-in microphones may be desirable.

SUMMARY

The present disclosure relates generally to lighting related solutions, and more particularly to lighting systems with voice operation capabilities. In an example embodiment, a lighting system with expanded coverage voice operation includes a lighting fixture that includes a wireless transceiver. The lighting system further includes a remote microphone device configured to receive a voice and to transmit wirelessly an audio stream generated from the voice. The lighting fixture is configured to receive the audio stream from the remote microphone device via the wireless transceiver and to transmit the audio stream to a cloud server.

In another example embodiment, a non-transitory computer-readable medium containing processor instructions executable by one or more processors of a lighting fixture, where executing the processor instructions causes the lighting fixture to receive an audio stream from a remote microphone device. The remote microphone device is configured to receive a voice. Executing the processor instructions further causes the lighting fixture to transmit the audio stream to a cloud server that provides a cloud voice service.

In another example embodiment, a lighting system with expanded coverage operation includes a lighting fixture that includes a wireless transceiver. The lighting system further includes a remote microphone device configured to receive a sound and to transmit wirelessly a first signal generated from the sound. The lighting fixture is configured to receive the first signal from the remote microphone device via the wireless transceiver and to transmit a second signal generated from the first signal to a cloud server.

These and other aspects, objects, features, and embodiments will be apparent from the following description and the claims.

BRIEF DESCRIPTION OF THE FIGURES

Reference will now be made to the accompanying drawings, which are not necessarily drawn to scale, and wherein.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals with the same last two digits may designate like or corresponding, but not necessarily identical, elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Figure 1:
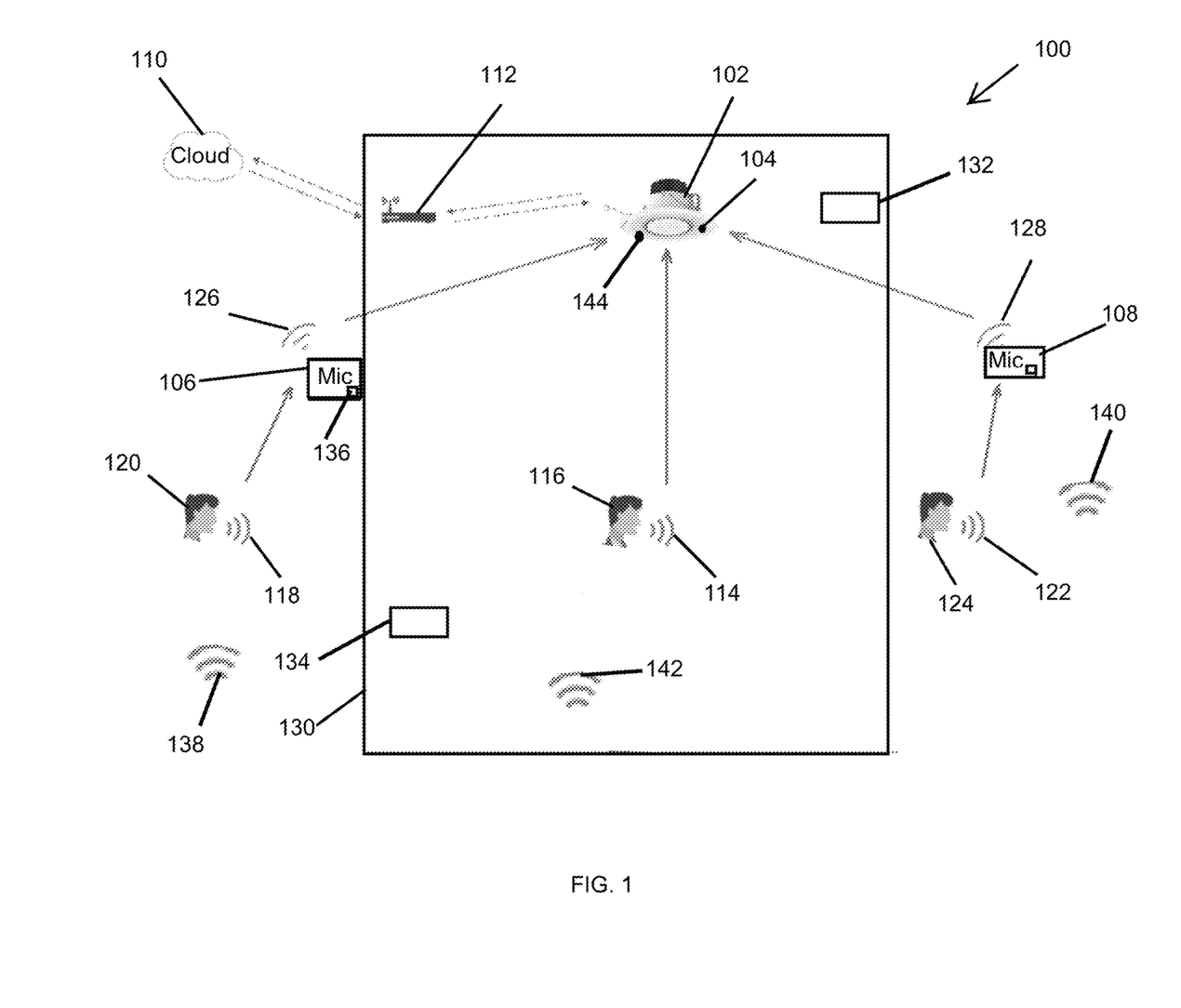
FIG. 1 illustrates a lighting system that includes remote microphone devices according to an example embodiment.

Turning now to the figures, example embodiments are described. FIG. 1 illustrates a lighting system 100 that includes remote microphones according to an example embodiment. In some example embodiments, the system 100 includes a lighting fixture 102 with a built-in microphone 104. The lighting fixture 102 may also include a built-in speaker 144 (e.g., one or more speakers). The system 100 may also include remote microphone devices 106, 108. The lighting fixture 102 may be located in a room 130 and the remote microphone devices 106, 108 may be located outside the room. The built-in microphone 104 may be capable of successfully receiving a voice 114 that is uttered by a person 116 within the room 130. For example, the voice 114 may include a command, such as a lighting control command, an appliance control command, etc. The lighting fixture 102 may transmit, wirelessly or via a wired connection, to a cloud service provider 110 (e.g., a cloud server) a signal generated from the voice 114. The cloud service provider 110 may receive the signal including the command from the lighting fixture 102 and may determine/identify the command. After determining/identifying the command, the cloud service provider 110 may send one or more instructions generated from the command to the lighting fixture 102. The command included in the voice 118 and the resulting instruction(s) received from the cloud service provider 110 may be a lighting command (e.g., turn on, turn off, dim, etc.), an appliance control command (e.g., turn on, turn off, etc.), etc. Alternatively or in addition, the cloud service provider 110 may send the instruction(s) generated from the command to another device, such as a lighting fixture 132, a device 134, etc., for example, depending on the command included in the voice 114.

In some example embodiments, the lighting fixture 102 may also receive via the built-in microphone 104 a sound 142 produced by a breaking-glass, a doorbell, a smoke alarm, footsteps, a crying baby, a toaster oven, an alarm clock, etc. The lighting fixture 102 may generate an audio stream from the sound 142 and transmit the audio stream to the cloud service provider 110. For example, the lighting fixture 102 may transmit the audio stream via a wireless signal. The cloud service provider 110 may receive and process the signal to determine/identify the sound. After identifying the sound, the cloud service provider 110 may transmit instructions/response to the lighting fixture 102 or to another device (e.g., the device 134) based on the identification of the sound. The lighting fixture 102 or the other device may receive the instructions/response from the cloud service provider 110 and operate accordingly. For example, the lighting fixture 102 may provide an audio notification or message via the speaker 144 based on the instructions/response received from the cloud service provider 110. The lighting fixture 102 may also provide an audio notification or message via the speaker 144 based on the instructions/response received from the cloud service provider 110, where the instructions/response are generated by the cloud service provider 110 based on a sound/voice received by the remote microphone devices 106, 108.

In some example embodiments, the remote microphone device 106 may be capable of successfully receiving a voice 118 that is uttered by a person 120. For example, the voice 118 may include a command. To illustrate, the command included in the voice 118 may be a lighting command (e.g., turn on, turn off, dim, etc. a particular lighting fixture or lighting fixtures), an appliance control command (e.g., turn on, turn off, etc. a particular appliance), etc. As a non-limiting example, the voice 118 may be a voice command, "Kitchen light on," "Alexa, turn on the kitchen light on," etc. The remote microphone device 108 may be capable of successfully receiving a voice 122 that is uttered by a person 124. For example, the voice 122 may include similar command(s) as the voice 118, such as a lighting command, an appliance control command, etc. In some example embodiments, the built-in microphone 104, the remote microphone device 106, and remote microphone device 108 may each include a single microphone or multiple microphones such as an array of microphones. In some example embodiments, the remote microphone devices 106, 108 may each be a light dimmer, a wallstation, a wall outlet (e.g., a power outlet, etc.), or another lighting system device. In some example embodiments, the remote microphone devices 106, 108 may each be included a light dimmer, a wallstation, a wall outlet (e.g., a power outlet, etc.), or another lighting system device.

In some example embodiments, the remote microphone device 106 may transmit the voice 118 received by the remote microphone device 106 to the lighting fixture 102 as a radiofrequency (RF) signal 126, and the remote microphone device 108 may transmit the voice 122 received by the remote microphone device 108 to the lighting fixture 102 as an RF signal 128. For example, the RF signals 126, 128 may be a Bluetooth signal, a ZigBee, or other types of wireless communications signals (e.g., a propriety protocol signal). Alternatively, one or both of the remote microphone devices 106, 108 may be connected to the lighting fixture 102 via wired connections. The remote microphone device 106 may send the voice 118 to the lighting fixture 102 as an audio stream, and the remote microphone device 108 may send the voice 118 to the lighting fixture 102 as an audio stream. In some example embodiments, the remote microphone devices 106, 108 may each store the respective audio stream in a storage/memory device of the respective remote microphone device 106, 108, and transmit the respective audio stream to the lighting fixture 102 from the storage/memory device.

In some example embodiments, the lighting fixture 102 may receive the RF signal 126 from the remote microphone device 106 and transmit a signal generated from the RF signal 126 to a cloud service provider 110. For example, the cloud service provider 110 may be or may include a cloud server (e.g., Amazon voice service server) that can process information contained in the signal received from the lighting fixture 102 and send back to the lighting fixture 102 or to another device instructions resulting from the processing of the signal. To illustrate, the lighting fixture 102 may receive the RF signal 126 and may generate an output RF signal that is transmitted to a network device 112 (e.g., a router and/or gateway device). The network device 112 may send the signal received from the lighting fixture 102 or a corresponding signal to the cloud service provider 110 wirelessly or via a wired connection. For example, the lighting fixture 102 may send a Wi-Fi signal to the network device 112, and the network device 112 may send a signal to the cloud service provider 110 via a wired connection, where the signal transmitted to the cloud service provider 110 is generated from the Wi-Fi signal.

To illustrate, the lighting fixture 102 may receive from the remote microphone devices 106 an audio stream generated from the voice 118 by the remote microphone devices 106 and transmit the audio stream to the cloud service provider 110 wirelessly and/or via wired connections. In some example embodiments, the lighting fixture 102 may first store the received audio stream in a storage/memory device of the lighting fixture 102 and transmit the audio stream to the cloud service provider 110 from the storage/memory device of the lighting fixture 102. In some example embodiments, the lighting fixture 102 may process (e.g., filter, etc.) the audio stream received from the remote microphone device 106 and transmit the processed audio stream to the cloud service provider 110.

In some example embodiments, the cloud service provider 110 may process the audio stream/information in the signal transmitted by the lighting fixture 102 to determine the command in the voice 118 received by the remote microphone device 106. For example, the command in the voice 118 may be to turn on, turn off, dim, etc. an illumination light provided by the lighting fixture 102. To illustrate, the lighting fixture 102 may provide an illumination light to illuminate an area (e.g., a room) below the lighting fixture 102. Alternatively, the command in the voice 118 may be to turn on, turn off, dim, etc. a light provided by a lighting fixture 132 in the room 130 or a lighting fixture that is in another room. As another example, the command in the voice 118 may be to turn on, turn off, etc. another device such as the device 134 in the room 130 or a device that is in another room. For example, the device 134 may be a stove, an oven, a television, a smartphone, a sound alarm device, another lighting device (e.g., a lighting fixture, a dimmer, a wallstation, etc.) etc. After determining/identifying the command in the voice 118 by processing the signal received from the lighting fixture 102, the cloud service provider 110 may send instruction(s) to the lighting fixture 102, to another lighting fixture (e.g., the lighting fixture 132), or to the device 134 (e.g., a smartphone, an appliance, a sound alarm device, etc.) depending on the command.

For example, the cloud service provider 110 may send one or more instructions to the lighting fixture 102 to turn on the light provided by the lighting fixture 102 if the command in the voice 118 received by the remote microphone device 106 is to turn on the light provided by the lighting fixture 102. As another example, the cloud service provider 110 may send one or more instructions to the lighting fixture 102 to turn off the light provided by the lighting fixture 102 if the command in the voice 118 received by the remote microphone device 106 is to turn off the light provided by the lighting fixture 102. As another example, the cloud service provider 110 may send one or more instructions to the device 134 to turn on the device 134 if the command in the voice 118 received by the remote microphone device 106 is to turn on the device 134.

In some example embodiments, the lighting fixture 102 may receive the RF signal 128 from the remote microphone device 108 and transmit a signal generated from the RF signal 128 to the cloud service provider 110 in the same manner as described above with respect to the remote microphone device 106. The cloud service provider 110 may process information contained in the signal from the lighting fixture 102 and send instructions resulting from the processing of the signal to the lighting fixture 102, to another lighting fixture, to an appliance, etc. in the same manner as described above.

In some example embodiments, the remote microphone devices 106, 108 may receive other sounds in addition to voices. For example, the remote microphone device 106 may receive a sound 138 produced by a breaking-glass, a doorbell, a smoke alarm, footsteps, a crying baby, a toaster oven, an alarm clock, etc. The remote microphone device 108 may also receive a sound 140 that is the same or a different sound from the sound 138. For example, the sound 140 may be a sound of a breaking-glass, a doorbell, a smoke alarm, footsteps, a crying baby, a toaster oven, an alarm clock, etc.

In some example embodiments, the remote microphone device 106 may receive the sound 138 and transmit a signal that includes an audio stream generated from the sound 138 to the lighting fixture 102 in a similar manner as described with respect to the voice 120. The lighting fixture 102 may receive the signal generated based on the sound 138 and transmit a second signal generated from the received signal to the cloud service provider 110. The remote microphone device 108 may receive the sound 140 and transmit a signal that includes an audio stream generated from the sound 140 to the lighting fixture 102 in a similar manner as described with respect to the voice 122. The lighting fixture 102 may receive the signal generated based on the sound 140 and transmit a second signal generated from the received signal to the cloud service provider 110.

The cloud service provider 110 may process the signals, including the audio streams included in the signals, from the lighting fixture 102 and send instructions resulting from the processing of the signals to the lighting fixture 102, to another lighting fixture, to an appliance, etc. in the same manner as described above.

In some example embodiments, the remote microphone devices 106, 108 may be in a standby mode and may become active to listen to a voice when a user provides an input via a physical interface 136 (e.g., a button) of the remote microphone devices 106, 108. Alternatively or in addition, the remote microphone devices 106, 108 may operate in a standby mode and may become active to listen to a voice after receiving a command from the lighting fixture 102. In some alternative embodiments, the remote microphone devices 106, 108 may operate in a standby mode while remaining active to listen for or detect voices. In general, when in the standby mode, the remote microphone devices 106, 108 may each consume less power by disabling or shutting off some of their components. In some example embodiments, the remote microphone devices 106, 108 may enter a standby mode if no voice is detected for a time period (e.g., 1 minute, 5 minutes, 1 hour, etc.). In some alternative embodiments, the remote microphone devices 106, 108 may remain in an active mode at all times. That is, the remote microphone devices 106, 108 may not enter or operate in a standby mode.

By using the remote microphone devices 106, 108, the voice coverage area of the lighting fixture 102 is significantly expanded. For example, a person that is outside of the coverage area of the microphone 104 may use voice commands to control the lighting fixture 102 and/or other devices.

In some alternative embodiments, the system 100 may include more or fewer remote microphone devices than shown. In some alternative embodiments, the remote microphone devices may be located within the same room to expand the voice operation coverage area of the lighting fixture 102 within the room. In some alternative embodiments, the lighting fixture 102 may be another type of lighting device (e.g., a dimmer, a wallstation, a wall outlet, etc.) without departing from the scope of this disclosure. In some alternative embodiments, the system 100 may include other voice-enabled lighting fixtures. In some alternative embodiments, the system 100 may include a local server that can perform operations described above as being performed by the cloud sound service provider 110. For example, the lighting fixture 102 may send to the local server a signal including a command received in a voice (e.g., the voice 114, the voice 118, or the voice 122). In some example embodiments, the physical interface 136 may be omitted without departing from the scope of this disclosure.

Figure 2:
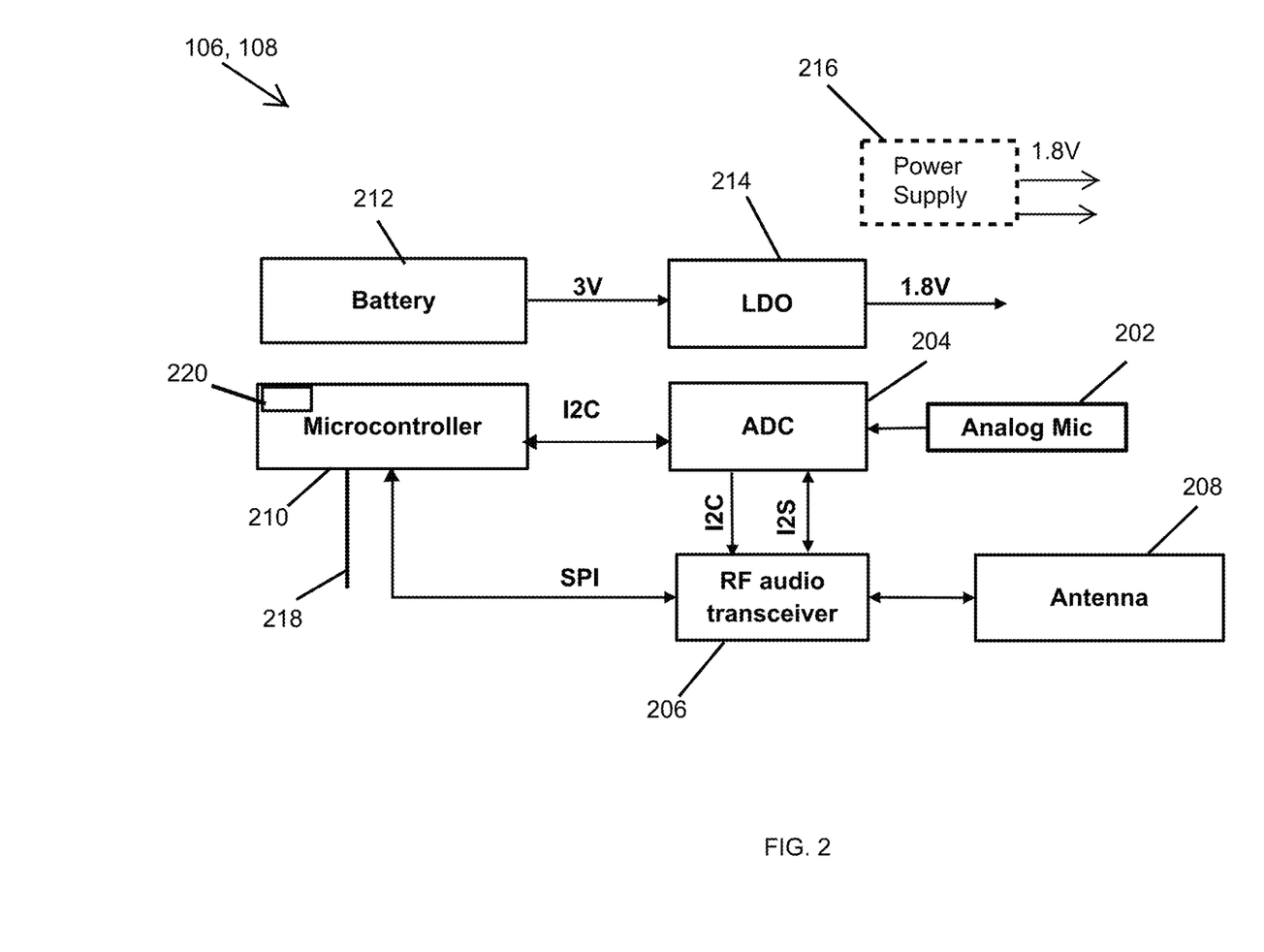
FIG. 2 illustrates a block diagram of the remote microphone devices of FIG. 1 according to an example embodiment.

FIG. 2 illustrates a block diagram of the remote microphone devices 106, 108 of FIG. 1 according to an example embodiment. Referring to FIGS. 1 and 2, in some example embodiments, each remote microphone device 106, 108 may include one or more analog microphones 202, an analog-to-digital converter 204, and a transceiver 206 that can transmit RF signals, such as the RF signals 126, 128, via an antenna 208. Each remote microphone device 106, 108 may also include a microcontroller 210 including supporting components such as a storage component 220 (e.g., a flash memory, etc.). For example, the microcontroller 210 may be used in the configuration and control of the overall operation of the remote microphone device 106, 108. To illustrate, the microcontroller 210 may execute code stored in the memory device to control operation of the remote microphone device 106, 108. Audio streams generated from sounds, such as the voices 118, 122 and the sounds 138, 140, may also be stored in the storage component 220 and may be transmitted to the lighting fixture 102 from the storage component 220.

In some example embodiments, each remote microphone device 106, 108 may include a battery 212 and a regulator 214 that can provide a power that is compatible with the other components of the remote microphone device 106, 108. Alternatively or in addition to the battery 212, one or both of the remote microphone devices 106, 108 may receive power from another power source. For example, each remote microphone device 106, 108 may receive power from an external power supply that is coupled to an AC power source (e.g., plugged into a wall power outlet). As another example, each remote microphone device 106, 108 may receive power from an optional built-in power supply 216 that is coupled to an AC power source (e.g., plugged into a wall power outlet). The internal power supply 216, when present, may provide one or more outputs that are compatible with the components of the remote microphone devices 106, 108.

In some example embodiments, the microcontroller 210 controls whether the remote microphone device 106, 108 operates in a standby mode. For example, the microcontroller 210 may control the remote microphone device 106, 108 to operate in a standby mode when no voice is detected for a time period (e.g., 5 minutes, 10 minutes, etc.). For example, the microcontroller 210 may control whether power is provided to one or more components of the remote microphone device 106, 108 to control whether the remote microphone device 106, 108 operates in a standby mode.

In some example embodiments, the microcontroller 210 may receive and process information received via the transceiver 206 and via a user interface connection 218 that may be coupled to the physical interface 136. For example, the microcontroller 210 may control the remote microphone device 106, 108 to exit the standby mode in response to a wake-up command from the lighting fixture 102 and/or in response to a user input received via the user interface connection 218. To illustrate, by controlling the remote microphone device 106, 108 to exit the standby mode, the microcontroller 210 may control the remote microphone device 106, 108 listen to a voice, such as the voices 118, 122.

In some example embodiments, the one or more analog microphones 202 may receive a voice, such as the voice 118, 122. The one or more analog microphones 202 may send the received voice as an analog signal to the analog-to-digital converter 204 that generates a digital signal from the analog signal and provides the digital signal to the transceiver 206. The transceiver 206 may transmit via the antenna 208 an RF signal (e.g., the RF signal 126 or the RF signal 128) corresponding to the digital signal. For example, the microcontroller 210 may control the power level and other parameters of the RF signal. If no voice is detected by the remote microphone device 106, 108 within a time period, the microcontroller 210 may control the remote microphone device 106, 108 to operate in the standby mode.

In some alternative embodiments, each remote microphone device 106, 108 may include other components such as other transceivers that can transmit and receive signals via wired connections. In some alternative embodiments, one or more components may be omitted or integrated with other components. In some example embodiments, the microcontroller 210 may control the wireless protocol for the transmission of the RF signal transmitted via the antenna 208. In some alternative embodiments, some of the components may be replaced by other components. For example, a digital microphone may be used instead of an analog microphone, which may result in a different combination and/or configuration of components.

Figure 3:
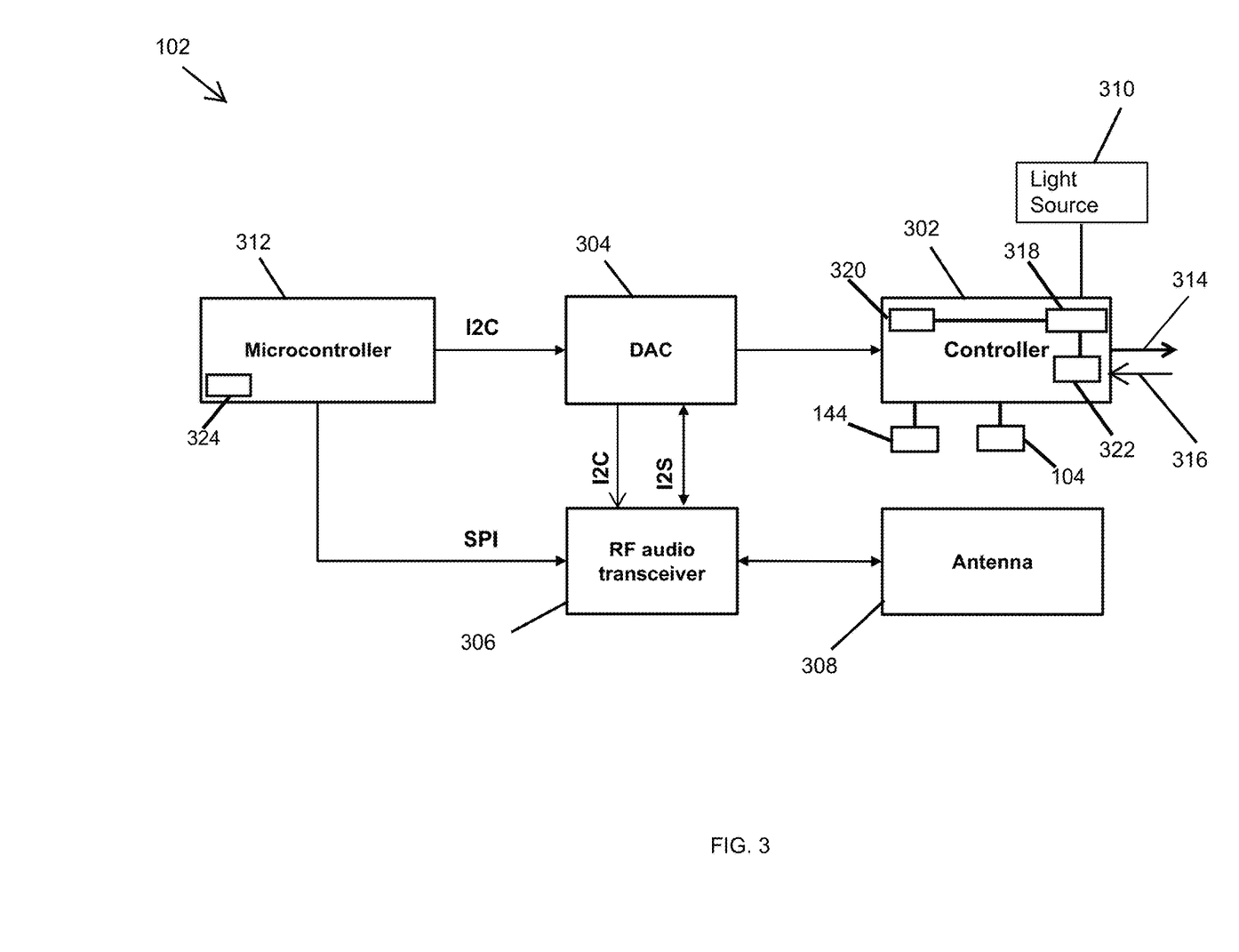
FIG. 3 illustrates a block diagram of the lighting fixture of FIG. 1 according to an example embodiment.

FIG. 3 illustrates a block diagram of the lighting fixture 102 of FIG. 1 according to an example embodiment. Referring to FIGS. 1-3, in some example embodiments, the lighting fixture 102 includes a controller 302, a digital-to-analog converter 304, a transceiver 306 that can transmit and receive radiofrequency signals, and an antenna 308. The lighting fixture 102 may also include a microcontroller 312 that includes or that is coupled to other components such as a storage component. For example, the microcontroller 312 may be used in configuration and control of the overall operations of the lighting fixture 102. The lighting fixture 102 also includes a light source 310 (e.g., an LED light source) that may include or that is coupled to other components such as a power source.

In some example embodiments, the transceiver 306 may receive an RF signal (e.g., the RF signal 126, 128) through the antenna 308 and provide the RF signal to the digital-to-analog converter 304 that generates an analog signal from the RF signal. The digital-to-analog converter (DAC) 304 provides the generated analog signal to the controller 302. The controller 302, which may include a microcontroller/microprocessor 318 and other components, may transmit the information contained in the analog signal from the DAC 304 via an output connection 314. For example, the information contained in the analog signal may be the command in the voice 118 or in the voice 122. A transceiver 322 of the controller 302 may transmit, wirelessly (e.g., as a Wi-Fi signal) or via a wired connection, the information contained in the analog signal to the network device 112. The network device 112 may send the information to the cloud service provider 110.

In some example embodiments, the controller 302 may receive a signal via an input connection 316 wirelessly (e.g., as a Wi-Fi signal) or via a wired connection, where the signal contains instructions from, for example, the cloud service provider 110. The controller 302 may control the lighting fixture 102 based on the instructions or send the instructions to other devices (e.g., other lighting fixtures or appliances). For example, the controller 302 may turn on, turn off, dim, etc. the light provided by the light source 310 based on the instructions received from the cloud service provider 110.

In some example embodiments, the controller 302 may also process the analog signal from the DAC 304 and control the lighting fixture 102 accordingly. For example, the controller 302 may turn on, turn off, dim, etc. the light provided by the light source 310 based on the command in the voices 118, 122.

In some example embodiments, the controller 302 may include the built-in microphone 104 and may control the lighting fixture 102 based on a command included in the voice 114. For example, the controller 302 may include an analog-to-digital converter that converts the analog signal from the microphone 104 to a digital signal. In some example embodiments, the controller 302 may invert ambient noise received by the built-in microphone 104 and may output the inverted ambient noise via the build-in speaker 144. The controller 302 alternatively or in addition may output, via the speaker 144, a sound that can drown out the ambient noise in an area near the lighting fixture 102.

In some example embodiments, the controller 302 may include the microphone 104 and may control the lighting fixture 102 based on a command included in the voice 114. For example, the controller 302 may include an analog-to-digital converter that converts the analog signal from the microphone 104 to a digital signal.

In some example embodiments, the controller 302 may include the microprocessor 318 along with support components such as a memory device 320 (e.g., a flash memory, etc.). For example, the microprocessor 318 of the controller 302 may execute code stored in the memory device 320 to perform some of the operations described herein with respect to the controller 302. The microprocessor 312 may also may execute code stored in a memory device 324 (e.g., a flash memory, etc.) to perform some of the operations described herein with respect to the lighting fixture 102. Audio streams received from the remote microphone device 106, 108 may also be stored in the storage component 324 and may be transmitted to the cloud service provider 110 from the storage component 324. In some example embodiments, the controller 302 and the microprocessor 312 may be integrated into a single component to perform operations described herein with respect to the lighting fixture 102.

In some alternative embodiments, the lighting fixture 102 may include other components without departing from the scope of this disclosure. In some alternative embodiments, some of the components of the lighting fixture 102 may be omitted without departing from the scope of this disclosure. In some alternative embodiments, some of the components of the lighting fixture 102 may be coupled in a different configuration than shown without departing from the scope of this disclosure. In some alternative embodiments, some of the components of the lighting fixture 102 may be replaced by other components.

Figure 4:
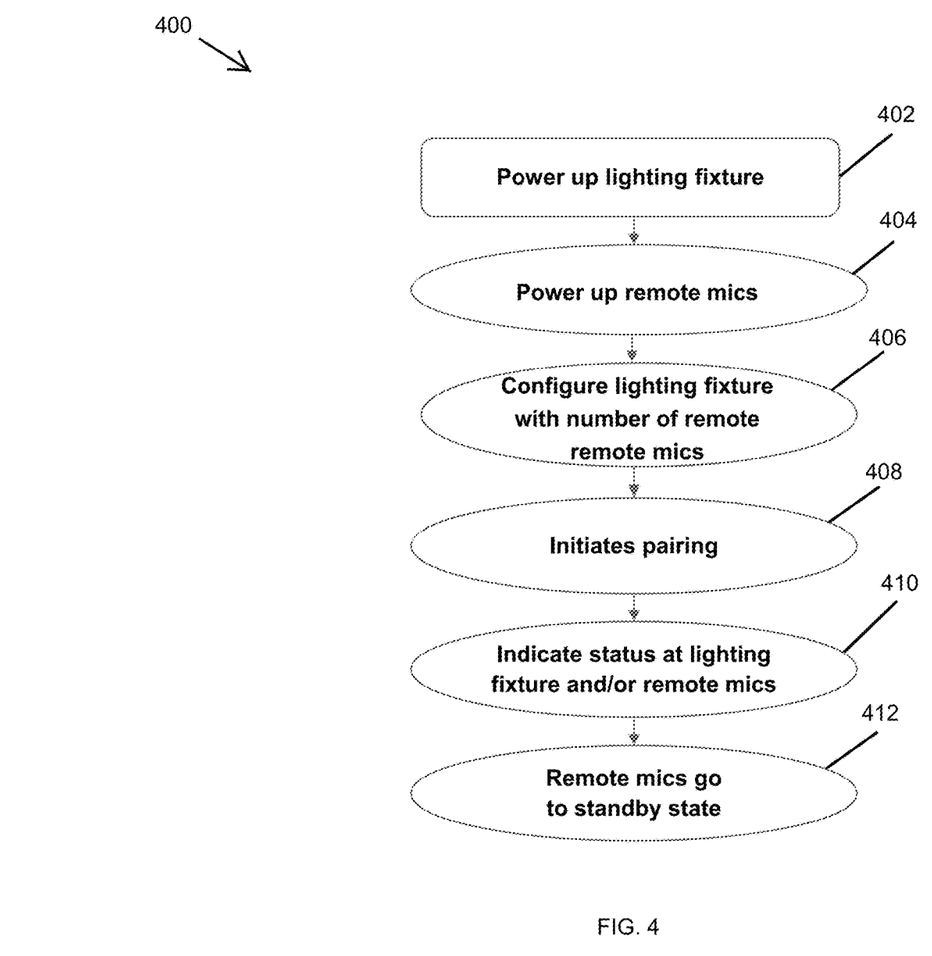
FIG. 4 illustrates a flowchart showing a method of operating the lighting system of FIG. 1 according to an example embodiment.

FIG. 4 illustrates a flowchart showing a method 400 of operating the lighting system 100 of FIG. 1 according to an example embodiment. Referring to FIGS. 1-4, in some example embodiments, the method 400 includes powering up the lighting fixture 102 at step 402. For example, the lighting fixture 102 may be powered up via a switch or a wireless command transmitted to the lighting fixture 102. At step 404, the method 400 may include powering up the remote microphone devices 106, 108, for example, using a switch, remotely via a wirelessly transmitted command, etc.

At step 406, the method 400 may include configuring/programming the lighting fixture 102 with information, such as the number of remote microphone devices, the identification information of the remote microphone devices, etc. For example, information may be transmitted wirelessly to the lighting fixture 102. At step 408, the method 400 includes initiating pairing between the lighting fixture 102 and the remote microphone devices 106, 108. For example, the microcontroller 210 of the remote microphone devices 106, 108 and the microcontroller 312 of the lighting fixture 102 may perform the pairing operations to establish communication. To illustrate, the microcontroller 312 may initiate the pairing operations in response to a user input received wirelessly.

At step 410, the method 400 includes indicating pairing status at the lighting fixture 102 and/or the remote microphone devices 106, 108. For example, the microcontroller 312 can control the lighting fixture 102 to flash indicator lights and/or the microcontroller 210 may control indicator lights of the respective one of the remote microphone devices 106, 108 to indicate that pairing has been completed. At step 412, the method 400 includes entering standby state by the remote microphone devices 106, 108. For example, the remote microphone devices 106, 108 may enter a standby mode until a user input or a microphone wake-up command is received.

In some alternative embodiments, one or more steps of the method 400 may include other steps without departing from the scope of this disclosure. In some alternative embodiments, one or more steps of the method 400 may be omitted without departing from the scope of this disclosure.

Figure 5:
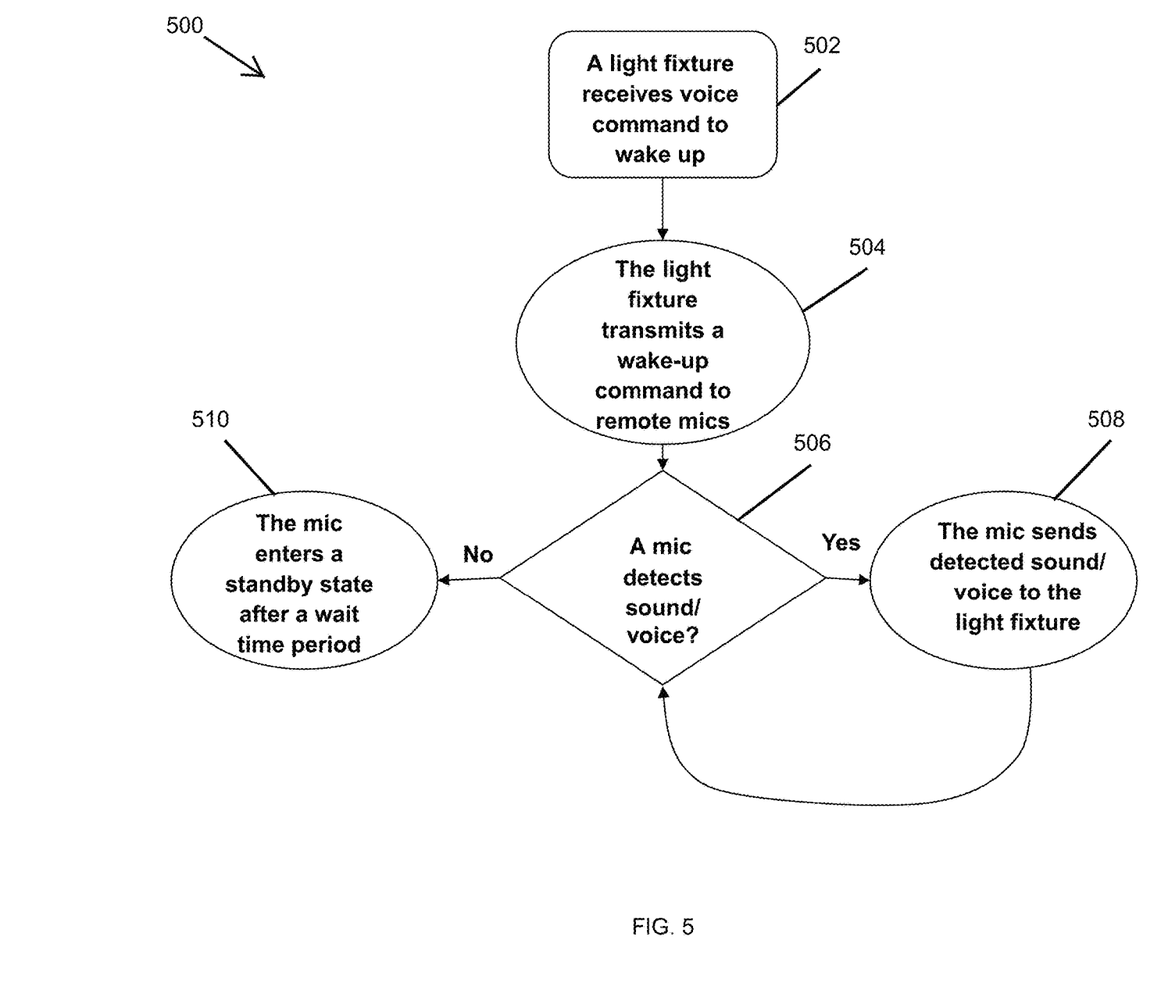
FIG. 5 illustrates a flowchart showing a method of operating the lighting system of FIG. 1 according to another example embodiment.

FIG. 5 illustrates a flowchart showing a method of operating the lighting system of FIG. 1 according to another example embodiment. Referring to FIGS. 1-5, in some example embodiments, at step 502, the method 500 includes receiving a wake-up voice command by the lighting fixture 102. For example, the wake-up voice command may include one or more words recognizable by the lighting fixture 102. To illustrate, the lighting fixture 102 (e.g., the controller 302 or the microcontroller 312) may process a voice received by the built-in microphone 104 to determine whether the voice includes the wake-up voice command. In response to receiving and identifying the wake-up voice command, the lighting fixture 102 may start listing for the voice 114 or other voices.

At step 504, the method 500 may include transmitting, by the lighting fixture 102, a wake-up command instructing one or both of the remote microphone devices 106, 108 to wake up. For example, the lighting fixture 102 (e.g., the controller 302 or the microcontroller 312) may transmit the wake-up command in response to receiving and detecting the wake-up voice command. At step 506, the method 500 may include exiting a standby mode, by one or both remote microphone devices 106, 108 if in the standby mode, and detecting/listening for a sound/voice, such as the voice 118, 122 and/or the sound 138, 140, in response to the wake-up command received from the lighting fixture 102. For example, the microcontroller 312 of each remote microphone device 106, 108 may determine whether a received command is the wake-up command.

At step 508, the method 500 may include sending/transmitting a sound/voice, such as the voice 118, 122 and/or the sound 138, 140, by one or both remote microphone devices 106, 108 in response to detecting the sound/voice. For example, the remote microphone devices 106, 108 may transmit an audio stream(s) of the sound/voice to the lighting fixture 102 as an RF signal(s). At step 510, the method 500 may include the remote microphone devices 106, 108 returning to the standby mode after a time period (e.g., 1 minute, 10 minutes, 1 hour, etc.) of an absence of a sound, for example, after receiving the wake-up command or after the last detection of a sound following the reception of the wake-up command.

In some example embodiments, the method 500 may be performed after the method 400 is performed. In some alternative embodiments, one or more steps of the method 500 may include other steps without departing from the scope of this disclosure. In some alternative embodiments, one or more of the steps of the method 500 may be omitted without departing from the scope of this disclosure.

Figure 6:
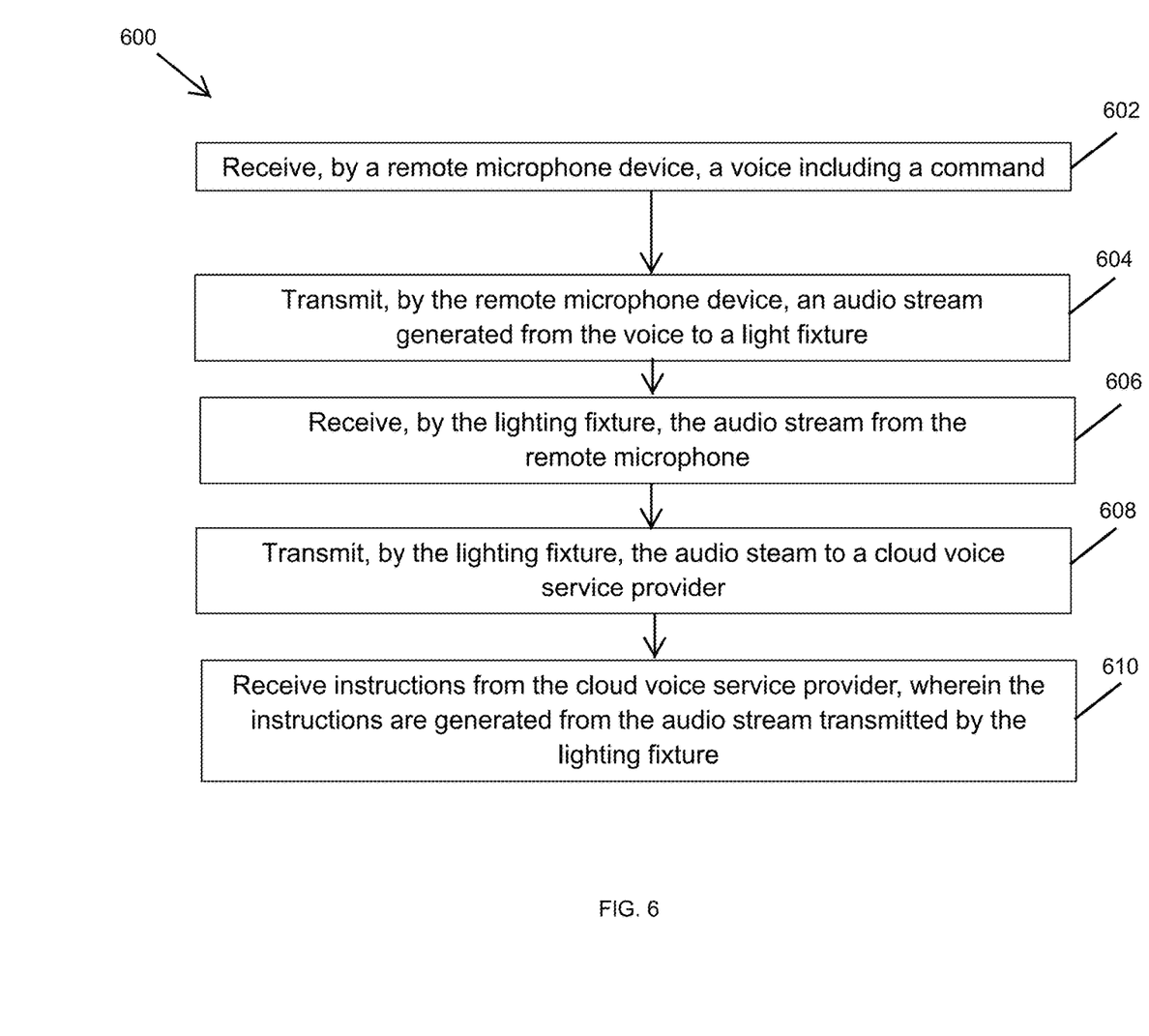
FIG. 6 illustrates a method of operating the lighting system of FIG. 1 according to another example embodiment.

FIG. 6 illustrates a method 600 of operating the lighting system 100 of FIG. 1 according to another example embodiment. Referring to FIGS. 1-6, in some example embodiments, the method 600 includes receiving, by a remote microphone device (e.g., the remote microphone device 106, 108) a voice including a command. For example, the remote microphone device 106 may receive the voice 118, and the remote microphone device 108 may receive the voice 122. At step 604, the method 600 may include transmitting, by the remote microphone device, an audio stream generated from the voice by the remote microphone device to a lighting fixture (e.g., the lighting fixture 102). For example, the remote microphone device 106 may transmit an audio stream of the voice 118 including the command received by the microphone 202 to the lighting fixture 102 as the RF signal 126.

At step 606, the method 600 may include receiving, by the lighting fixture, the audio stream from the remote microphone. For example, the lighting fixture 102 may receive the RF signal 126 via the transceiver 306 and the antenna 308. At step 608, the method 600 may include transmitting, by the lighting fixture, the audio stream to a cloud service provider (e.g., the cloud service provider 110). For example, the lighting fixture 102 may receive the audio stream of the voice 118, received as the RF signal 126, and transmit the audio stream using a signal to the cloud service provider 110 wirelessly and/or via a wired connection. At step 610, the method 600 may include receiving instructions from the cloud service provider, where the instructions are generated from or correspond to the command included in the voice received by the remote microphone device, such as the remote microphone device 106, 108, and transmitted to the lighting fixture 102 in an audio stream. The instructions from the cloud service provider may be received by the lighting fixture or by another device, such as another lighting fixture, appliance, etc., depending on the command received by the remote microphone device 106, 108.

In some example embodiments, the method 600 may be performed after the method 500 is performed. In some alternative embodiments, one or more steps of the method 600 may include other steps without departing from the scope of this disclosure. In some alternative embodiments, one or more of the steps of the method 600 may be omitted without departing from the scope of this disclosure.

Figure 7:
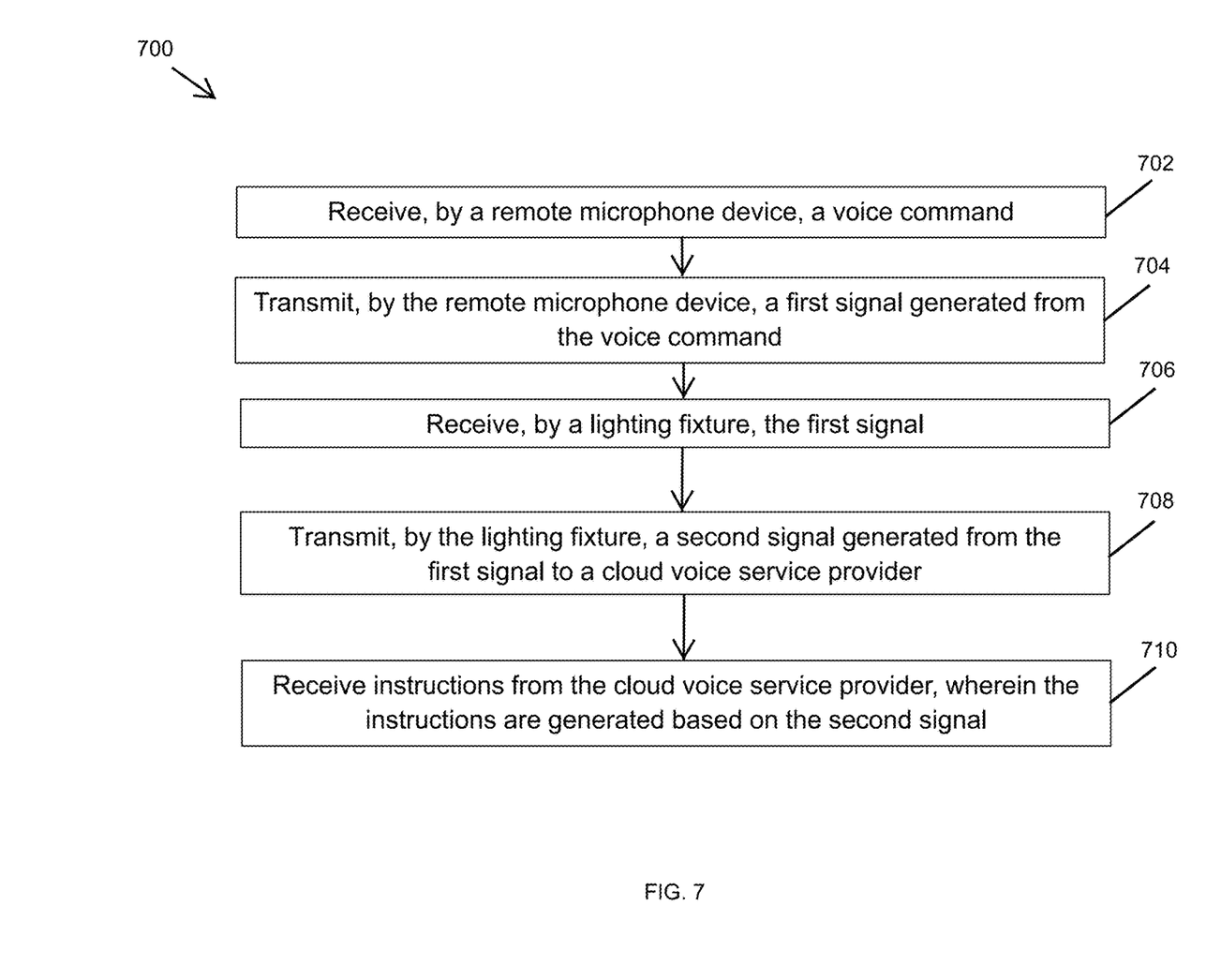
FIG. 7 illustrates a method of operating the lighting system of FIG. 1 according to another example embodiment.

FIG. 7 illustrates a method of operating the lighting system 100 of FIG. 1 according to another example embodiment. Referring to FIGS. 1-5 and 7, in some example embodiments, the method 700 includes receiving, by a remote microphone device (e.g., the remote microphone device 106, 108), a voice command (e.g., the voices 118, 122). For example, the remote microphone device may receive the voice command via the microphone 202.

At step 704, the method 700 may include transmitting, by the remote microphone device, a first signal (e.g., the RF signal 126, 128) generated from the voice command. For example, the remote microphone device may transmit an audio stream of the voice command as the first signal. At step 706, the method 700 may include receiving, by a lighting fixture (e.g., the lighting fixture 102), the first signal transmitted by the remote microphone device. At step 708, the method 700 may include transmitting, by the lighting fixture to a cloud service provider (e.g., the cloud service provider 110), a second signal generated from the first signal. For example, the second signal transmitted by the lighting fixture 102 may be a wireless signal (e.g., a Wi-Fi signal) that includes the command included in the voice received by the remote microphone device 106, 108.

At step 710, the method 700 may include receiving instructions from the cloud service provider, where the instructions are generated based on the second signal. The instructions from the cloud service provider may be received by the lighting fixture or by another device, such as another lighting fixture, appliance, etc., depending on the command received by the remote microphone device 106, 108. For example, the cloud service provider 110 may identify the voice command received by the remote microphone device 106, 108 by processing the signal received from the lighting fixture 102 and transmit one or more instructions to the lighting fixture 102, to another lighting fixture, or to an appliance, for example, depending on the command/instruction. For example, if the voice command applies to the lighting fixture 102 (e.g., turning on, off, etc. the lighting fixture 102), the cloud service provider 110 may send the resulting instruction(s) to the lighting fixture 102. If the voice command applies to another device, such as another lighting fixture or appliance, the cloud service provider 110 may send the resulting instruction(s) to the other device. In some example embodiments, the cloud service provider 110 may transmit the instruction(s) to the lighting fixture 102, where the lighting fixture 102 may transmit the instruction(s) to another lighting fixture or an appliance depending on the instruction(s).

In some example embodiments, the method 700 may be performed after the method 500 is performed. In some alternative embodiments, one or more steps of the method 700 may include other steps without departing from the scope of this disclosure. In some alternative embodiments, one or more of the steps of the method 700 may be omitted without departing from the scope of this disclosure.

Figure 8:
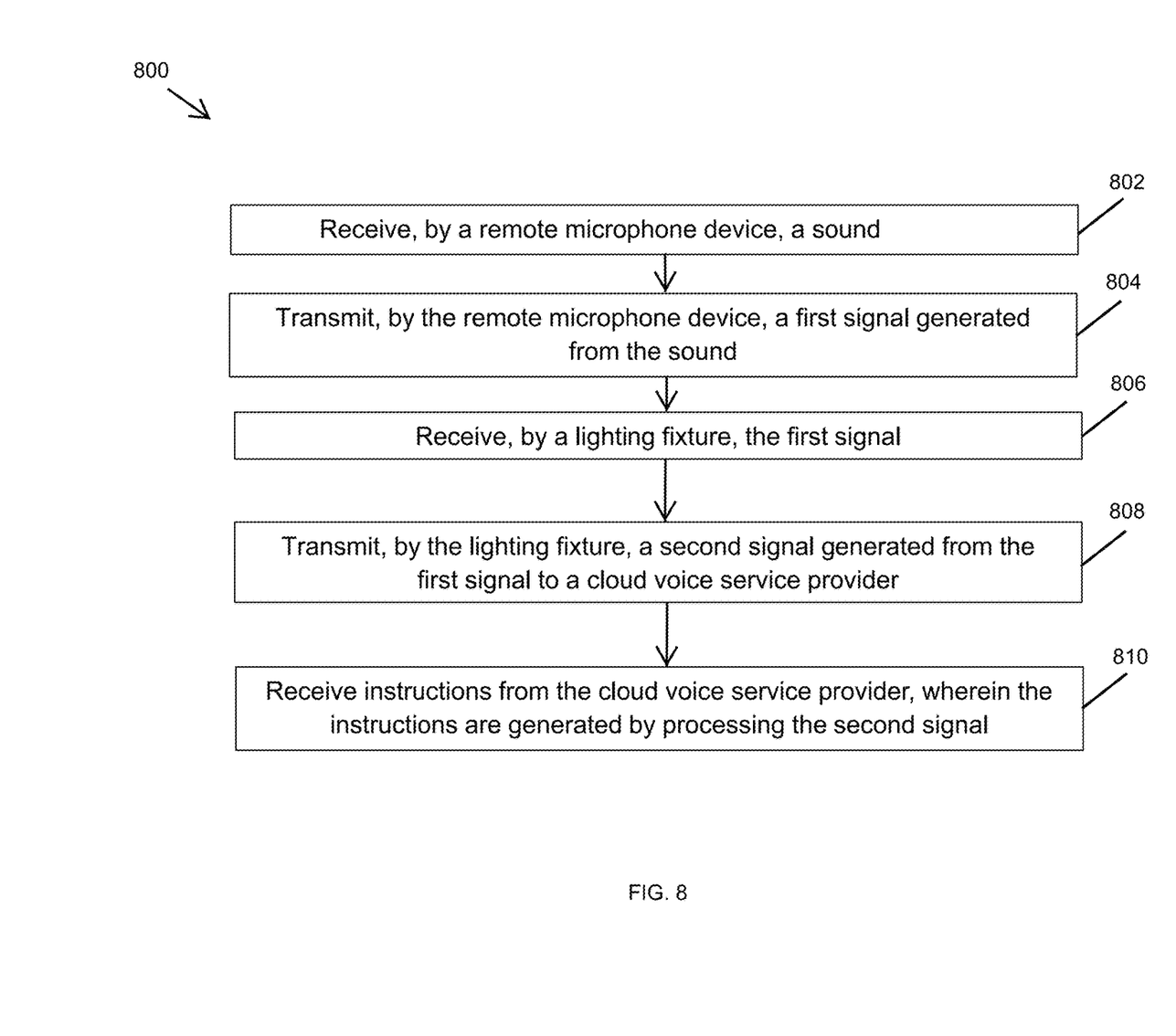
FIG. 8 illustrates a method of operating the lighting system of FIG. 1 according to another example embodiment.

FIG. 8 illustrates a method of operating the lighting system 100 of FIG. 1 according to another example embodiment. Referring to FIGS. 1-5 and 8, in some example embodiments, the method 800 includes receiving, by a remote microphone device (e.g., the remote microphone device 106, 108), a sound (e.g., the voices 138, 140). For example, the remote microphone device may receive the sound via the microphone 202. To illustrate, the remote microphone device may receive a sound of a breaking-glass, a doorbell, a smoke alarm, footsteps, a crying baby, a toaster oven, an alarm clock, etc.

At step 804, the method 800 may include transmitting, by the remote microphone device, a first signal (e.g., the RF signal 126, 128) generated from the sound. For example, the remote microphone device may transmit an audio stream of the sound. At step 806, the method 800 may include receiving, by a lighting fixture (e.g., the lighting fixture 102), the first signal, which includes the audio stream of the sound, transmitted by the remote microphone device. At step 808, the method 800 may include transmitting, by the lighting fixture to a cloud service provider (e.g., the cloud service provider 110), a second signal generated from the first signal, the second signal includes the audio stream of the sound. For example, the second signal transmitted by the lighting fixture 102 may be a wireless signal (e.g., a Wi-Fi signal) that includes the audio stream generated from the sound received by the remote microphone device 106, 108.

At step 810, the method 800 may include receiving instructions from the cloud service provider, where the instructions are generated based on the second signal including the audio stream. The instructions from the cloud service provider may be received by the lighting fixture or by another device, such as another lighting fixture, appliance, etc., for example, depending on the sound received by the remote microphone device 106, 108. The cloud service provider 110 may identify the sound by processing the second signal received from the lighting fixture 102. For example, the cloud service provider 110 may identify the sound received by the remote microphone device 106, 108 as a breaking-glass sound and send the instructions to a sound alarm device, directly or through the lighting fixture 102. As another example, the cloud service provider 110 may identify the sound received by the remote microphone device 106, 108 as a crying-baby sound and send the instructions to a smartphone, directly or through the lighting fixture 102. In some example embodiments, the cloud service provider 110 may transmit the instruction(s) to the lighting fixture 102, where the lighting fixture 102 may transmit the instruction(s) to another lighting fixture or an appliance depending on the instruction(s).

In some example embodiments, the method 800 may be performed after the method 500 is performed. In some alternative embodiments, one or more steps of the method 800 may include other steps without departing from the scope of this disclosure. In some alternative embodiments, one or more of the steps of the method 800 may be omitted without departing from the scope of this disclosure.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A lighting system with expanded coverage voice operation, comprising:
    a lighting fixture comprising a wireless transceiver, wherein the lighting fixture is located in a first area; and
    a remote microphone device configured to receive a voice and to transmit to the lighting fixture an audio stream generated from the voice wirelessly, wherein the remote microphone device is located in a second area that is different from the first area, wherein the lighting fixture is configured to receive the audio stream from the remote microphone device via the wireless transceiver and to transmit the audio stream to a cloud server that provides a cloud voice service, wherein the lighting fixture is configured to receive one or more instructions from the cloud server, wherein the one or more instructions are generated by the cloud server based on the audio stream, and wherein one or more devices are controlled based on the one or more instructions received from the cloud server.

2. The lighting system of claim 1, wherein the remote microphone device is a light dimmer or a wall outlet.

3. The lighting system of claim 1, wherein the lighting fixture is configured to control a light source of the lighting fixture based on the one or more instructions.

4. The lighting system of claim 1, wherein the lighting fixture comprises a built-in microphone.

5. The lighting system of claim 4, wherein the lighting fixture is configured to receive a second voice via the built-in microphone and to transmit to the cloud server a second audio stream generated from the second voice.

6. The lighting system of claim 4, wherein the lighting fixture is configured to transmit a microphone wake-up command to the remote microphone device in response to receiving the wake-up voice command.

7. The lighting system of claim 1, wherein the remote microphone device is configured to receive a microphone wake-up command and to start listening for a sound in response to the microphone wake-up command.

8. The lighting system of claim 7, wherein the remote microphone device is configured to enter a standby state if the sound is undetected by the remote microphone device within a wait time period after receiving the microphone wake-up command.

9. The lighting system of claim 1, further comprising a second lighting fixture configured to receive the one or more instructions from the cloud server.

10. A lighting system with expanded coverage operation, comprising:
    a lighting fixture comprising a wireless transceiver;
    a first remote microphone device configured to receive a first sound and to transmit wirelessly to the lighting fixture a first signal generated from the first sound, wherein the lighting fixture is configured to receive the first signal from the first remote microphone device via the wireless transceiver and to transmit a second signal generated from the first signal to a cloud server; and
    a second remote microphone device configured to receive a second sound and to transmit wirelessly to the lighting fixture a third signal generated from the second sound, wherein the lighting fixture is configured to receive the third signal from the second remote microphone device via the wireless transceiver and to transmit to the cloud server a fourth signal generated from the third signal, wherein the lighting fixture, the first remote microphone device, and the second remote microphone device are in different rooms from each other, wherein the lighting fixture is configured to receive instructions from the cloud server, and wherein the instructions are generated by the cloud server based on the second signal and the fourth signal received from the lighting fixture.

11. The lighting system of claim 10, wherein the cloud server is configured to identify the first sound by processing the second signal and generate the instructions based on identifying the first sound.

12. The lighting system of claim 10, wherein the cloud server is configured to identify the second sound by processing the fourth signal and to generate the instructions based on identifying the second sound and wherein a third device is configured to receive the instructions from the cloud server.

13. The lighting system of claim 10, wherein the lighting fixture comprises a built-in microphone and a built-in speaker, wherein the lighting fixture is configured to receive a third sound via the built-in microphone and transmit a third signal generated from the second sound to the cloud server, wherein the lighting fixture is configured to receive a response from the cloud server and provide the response via the speaker, and wherein the response is generated by the cloud server by processing the third signal.

14. The lighting system of claim 13, wherein the lighting fixture is configured to output an inverted ambient noise sound via the built-in speaker and where the inverted ambient noise sound is generated by the lighting fixture by inverting an ambient noise received by the built-in microphone.

15. A lighting system with expanded coverage voice operation, comprising:
    a lighting fixture comprising a wireless transceiver; and
    a remote microphone device configured to receive a voice and to transmit an audio stream generated from the voice wirelessly, wherein the lighting fixture is configured to receive the audio stream from the remote microphone device via the wireless transceiver and to transmit the audio stream to a cloud server that provides a cloud voice service, wherein the lighting fixture is configured to transmit a microphone wake-up command to the remote microphone device based on a wake-up voice command received by the lighting fixture via a built-in microphone of the lighting fixture, and wherein the remote microphone device is configured to receive the microphone wake-up command, to start listening for a sound in response to the microphone wake-up command, and to enter a standby state if the sound is undetected by the remote microphone device within a wait time period after receiving the microphone wake-up command.

16. The lighting system of claim 15, wherein the remote microphone device is a lighting control device or a wall outlet.

17. The lighting system of claim 16, wherein the lighting control device is a light dimmer.

18. The lighting system of claim 15, wherein the lighting fixture is configured to control a light source of the lighting fixture based on the one or more instructions received from the cloud server.

19. The lighting system of claim 15, further comprising a second remote microphone device and a second lighting fixture, wherein the second remote microphone is configured to receive a second voice and to transmit to the lighting fixture wirelessly a second audio stream generated from the second voice and wherein the second lighting fixture is configured to receive the one or more instructions from the cloud server and to operate based on the one or more instructions.

* * * * *